(12) United States Patent
Hashimoto et al.

(10) Patent No.: US 10,727,511 B2
(45) Date of Patent: Jul. 28, 2020

(54) FUEL CELL

(71) Applicants: Keiji Hashimoto, Kariya (JP); Kousuke Kawajiri, Kariya (JP); Satoshi Futami, Kariya (JP)

(72) Inventors: Keiji Hashimoto, Kariya (JP); Kousuke Kawajiri, Kariya (JP); Satoshi Futami, Kariya (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 198 days.

(21) Appl. No.: 14/410,465

(22) PCT Filed: Mar. 1, 2013

(86) PCT No.: PCT/JP2013/055718
§ 371 (c)(1),
(2) Date: Dec. 22, 2014

(87) PCT Pub. No.: WO2014/013747
PCT Pub. Date: Jan. 23, 2014

(65) Prior Publication Data
US 2015/0333357 A1 Nov. 19, 2015

(30) Foreign Application Priority Data

Jul. 17, 2012 (JP) .................... 2012-158737

(51) Int. Cl.
*H01M 8/04291* (2016.01)
*H01M 8/1004* (2016.01)
(Continued)

(52) U.S. Cl.
CPC ..... *H01M 8/04291* (2013.01); *H01M 8/0265* (2013.01); *H01M 8/0276* (2013.01);
(Continued)

(58) Field of Classification Search
None
See application file for complete search history.

(56) References Cited

U.S. PATENT DOCUMENTS 6,649,297 B1 11/2003 Marchand et al.
9,160,020 B2 10/2015 Kawajiri et al.
(Continued)

FOREIGN PATENT DOCUMENTS

EP 2 618 413 A1 7/2013
JP 61-279068 A 12/1986
(Continued)

OTHER PUBLICATIONS

Extended European Search Report for Application No. 13820402.9, dated Feb. 4, 2016 (6 pages).
(Continued)

*Primary Examiner* — Carmen V Lyles-Irving
(74) *Attorney, Agent, or Firm* — Patterson Thuente Pederson, P.A.

(57) ABSTRACT

A fuel battery includes unit cells, each of which includes a membrane electrode assembly having two gas diffusion layers. Gas passage forming bodies are stacked on an outer surface of each of the gas diffusion layers of each of the unit cells so that each of the unit cells includes a fuel gas passage and an oxidant gas passage. Each of the gas passage forming bodies includes water guide passages, each of which is located between adjacent ones of the gas passages. A communication passage is arranged between each of the gas passages and an adjacent one of the water guide passages to guide water from the gas passage to the water guide passage. The communication passage has a higher pressure loss than that of the gas passage.

4 Claims, 8 Drawing Sheets

(51) Int. Cl.
*H01M 8/04089* (2016.01)
*H01M 8/241* (2016.01)
*H01M 8/0265* (2016.01)
*H01M 8/0276* (2016.01)
*H01M 8/04119* (2016.01)
*H01M 8/1018* (2016.01)

(52) U.S. Cl.
CPC ... *H01M 8/04089* (2013.01); *H01M 8/04126* (2013.01); *H01M 8/1004* (2013.01); *H01M 8/241* (2013.01); *H01M 2008/1095* (2013.01); *H01M 2300/0082* (2013.01)

(56) References Cited

U.S. PATENT DOCUMENTS

| | | | |
|---|---|---|---|
| 2007/0065705 A1* | 3/2007 | Boucher | H01M 8/0273 429/483 |
| 2011/0287334 A1* | 11/2011 | Tanaka | H01M 4/8626 429/480 |
| 2012/0028139 A1 | 2/2012 | Kawajiri et al. | |
| 2012/0301810 A1* | 11/2012 | Kawajiri | H01M 8/026 429/482 |

FOREIGN PATENT DOCUMENTS

| | | |
|---|---|---|
| JP | S 63-58769 A | 3/1988 |
| JP | 06-231793 A | 8/1994 |
| JP | 09-283157 A | 10/1997 |
| JP | 2000-113897 A | 4/2000 |
| JP | 2002-530816 A | 5/2000 |
| JP | 2004-103455 A | 4/2004 |
| JP | 2005-038738 A | 2/2005 |
| JP | 2006-253038 A | 9/2006 |
| JP | 2007-294340 A | 11/2007 |
| JP | 2008-287945 A | 11/2008 |
| JP | 2008-293728 A | 12/2008 |
| JP | 2009-048775 A | 3/2009 |
| JP | 2009-087844 A | 4/2009 |
| JP | 2011-150801 A | 8/2011 |
| WO | WO 2010/113534 A1 | 10/2010 |

OTHER PUBLICATIONS

English translation of International Preliminary Report on Patentability for PCT/JP2013/055718, 4 pages.
Translation of International Search Report for PCT/JP2013/055718, dated Apr. 9, 2013, 4 pgs.
PCT/ISA/210 International Search Report for PCT/JP2013/055718, 5 pgs.

* cited by examiner

FUEL CELL

RELATED APPLICATIONS

The present application is a National Phase entry of PCT Application No. PCT/JP2013/055718, filed Mar. 1, 2013, which application claims priority to Japanese Application No. 2012-158737, filed Jul. 17, 2012, both of said applications being hereby incorporated by reference in their entirety.

BACKGROUND OF THE INVENTION

The present invention relates to a fuel battery.

A fuel battery generally has a stack structure in which unit cells 12 (fuel battery cells), such as the one shown in FIG. 11, are stacked (refer to Japanese Laid-Open Patent Publication No. 2011-150801). Each unit cell 12 includes two frames 13 and 14. A membrane electrode assembly (MEA) 15 is arranged in a bonded portion of the frames 13 and 14. The membrane electrode assembly 15 includes a solid polymer electrolyte membrane 16 formed by an ion-exchange membrane, an electrode catalyst layer 17 located at an anode side, and an electrode catalyst layer 18 located at a cathode side. The periphery of the solid polymer electrolyte membrane 16 is held between the frames 13 and 14.

A gas diffusion layer 19 located at the anode side is laminated on a surface of the electrode catalyst layer 17. A gas diffusion layer 20 located at the cathode side is laminated on a surface of the electrode catalyst layer 18. A first gas passage forming body 21 located at the anode side is stacked on a surface of the gas diffusion layer 19. A second gas passage forming body 22 located at the cathode side is stacked on a surface of the gas diffusion layer 20. A flat separator 23 is bonded to a surface of the first gas passage forming body 21. A flat separator 24 is bonded to a surface of the second gas passage forming body 22.

The first gas passage forming body 21 and the second gas passage forming body 22 have the same structure. Thus, the structure of the second gas passage forming body 22 will be described below. In FIGS. 11 and 12, the same reference numerals as the second gas passage forming body 22 are given to those components of the first gas passage forming body 21 having the same structure.

The second gas passage forming body 22 includes a flat plate material 25. A number of locations of the flat plate material 25 are cut and raised to form first projections 26a and second projections 26b. The first projections 26a and the second projections 26b, which form gas passages, are cut and raised to project toward the gas diffusion layer 20.

The second projections 26b are arranged in rows. A first projection 26a is located adjacent to a gap between two second projections 26b located next to each other in the same row. The first projections 26a and the second projections 26b contact the gas diffusion layer 20. This forms main passages h1, which serve as oxidant gas passages, between the flat plate material 25 and the gas diffusion layer 20. Adjacent ones of the main passages h1 are in communication with each other through sub-passages h2 located between the first projections 26a and the second projections 26b.

The flat plate material 25 includes small third projections 27 projecting toward the separator 24. The third projections 27 are located at an upstream side with respect to the gas flow direction P in correspondence with the first and second projections 26a and 26b. As shown in FIGS. 11 and 12, the third projections 27, which form water passages 28, are extruded to project toward the separator 24. The third projections 27 each contact the separator 24. This forms the water passages 28 between the flat plate material 25 and the separator 24. The depth of the water passages 28 is set within a range of, for example, 10 to 50 nm.

Each of the first projections 26a and the second projections 26b includes a communication hole 29 extending through the first or second projection 26a, 26b in a direction Q orthogonal to the gas flow direction P. That is, the first projections 26a and the second projections 26b each open at two locations, left and right sides as viewed from the gas flow direction P, to form the communication holes 29. The gas passages are in communication with the water passages 28 through the communication holes 29. The water passages 28 serve as a water guide layer.

As described above, the first gas passage forming body 21 has the same structure as the second gas passage forming body 22. However, the direction in which fuel gas flows in the gas passages formed by the first gas passage forming body 21 differs by 90 degrees from the direction in which oxidant gas flows in the gas passages formed by the second gas passage forming body 22. That is, the two directions are orthogonal.

In such a conventional fuel battery cell that has the above structure, when power is generated, that is, when the fuel gas (hydrogen) and the oxidant gas (oxygen) are respectively supplied to the anode side and the cathode side, electrochemical reaction of hydrogen and oxygen generates water in the electrode catalyst layer 18 and gas diffusion layer 20 located at the cathode side. To improve the efficiency of power generation, the fuel gas and the oxidant gas are each humidified by a humidifier and then supplied to the unit cell 12.

The water generated at the cathode side enters the gas diffusion layer 20 and the main passages h1 of the gas passage forming body 22 located at the cathode side. Some of the water generated at the cathode side is reversely diffused (permeated) through the membrane electrode assembly 15 to enter, as osmosis water, the gas diffusion layer 19 and the main passages h1 of the gas passage forming body 21 located at the anode side.

In the gas passages at the anode and cathode sides, the generated water and the osmosis water are discharged to the main passages h1 in this manner. Some of the water moves through the communication holes 29 to the water passages 28 (water guide layer) due to the capillary action of the water passages 28. The fluid pressure of gas moves the water in the water passages 28 toward the downstream side. Thus, the first gas passage forming body 21 and the second gas passage forming body 22, which are formed by porous bodies, each include a liquid-phase separation porous body passage, which is the water guide layer (water passage 28).

SUMMARY OF THE INVENTION

In a fuel battery using a liquid-phase separation porous body passage such as that described above, during a low load condition, the amount of generated water and osmosis water is small. Thus, as described above, the water moves from the main passages h1 to the water guide layer without remaining in the main passages h1. This allows plenty of gas to flow into the main passages h1.

However, during a high load condition, the amount of generated water and osmosis water is large. Thus, the water may overflow from the water guide layer into the main passages h1. FIG. 13 is a schematic diagram showing the main passages h1 and the sub-passages h2 when water overflows into a main passage h1 and remains in the main passage h1.

In this case, many sub-passages h2 are in communication with each main passage H1. Thus, when gas flows in the main passage h1 containing the remaining water R, the gas bypasses the location where the remaining water R exists and flows through the sub-passages h2 into other main passages h1. This is because the remaining water R causes a pressure loss in the main passage h1 that is greater than the total pressure loss of the sub-passages h2, which serve as bypasses. This causes a problem in which the remaining water R continuously remains in the main passage h1 without being pushed away by gas. The continuously remaining water adversely affects the gas diffusion performance and causes a non-uniform current distribution at the downstream side of the main passage h1 containing the remaining water R. This lowers the power generation performance.

Additionally, in a fuel battery lacking a liquid-phase separation porous body passage, the first gas passage forming body 21 and the second gas passage forming body 22, which are shown in FIG. 11, are omitted and in lieu of them, for example, as shown in FIG. 14, the separators 23 and 24 each include groove passages m extending in the gas flow direction. Projections ma, which define the groove passages m, are arranged to contact the electrode catalyst layers 17 and 18 of the membrane electrode assembly 15. In such a fuel battery, as shown in FIG. 14, if remaining water R exists in a groove passage m when the fuel battery is in a high load condition, the gas can push away the remaining water R toward the downstream side. However, during a low load condition, the gas pressure cannot push away the remaining water. Thus, the water continues to remain in the groove passage m. This adversely affects the gas diffusion performance and causes a non-uniform current distribution. Thus, the power generation performance may be lowered.

It is an object of the present invention to provide a fuel battery that removes remaining water regardless of high or low load conditions so that an improved gas diffusion performance and a uniform current distribution can be obtained, thereby improving the power generation performance.

To solve the above problem, a first aspect of the present invention provides a fuel battery including a plurality of stacked unit cells. Each of the unit cells includes a membrane electrode assembly and two separators located on opposite sides of the membrane electrode assembly. The membrane electrode assembly includes a solid polymer electrolyte membrane, electrode catalyst layers laminated on anode side and cathode side surfaces of the solid polymer electrolyte membrane, and gas diffusion layers laminated on an outer surface of each of the electrode catalyst layers. Gas passage forming bodies are stacked on an outer surface of each of the gas diffusion layers of each of the unit cells so that each of the unit cells includes a fuel gas passage and an oxidant gas passage. At least one of the gas passage forming bodies of each of the unit cells has a wave-shaped cross-section to define gas passages and water guide passages. Each of the water guide passages is located between adjacent ones of the gas passages. Each of the gas passages has a cross-sectional shape that widens toward the membrane electrode assembly. A communication passage is arranged between each of the gas passages and an adjacent one of the water guide passages to guide water from the gas passage to the water guide passage. The communication passage has a higher pressure loss than that of the gas passage.

A second aspect of the present invention provides the fuel battery of the first aspect characterized in that the communication passages guide water from the gas passages to the water guide passages using a capillary action.

A third aspect of the present invention provides the fuel battery of the first or second aspect characterized in that the gas passages are groove-shaped.

A fourth aspect of the present invention provides the fuel battery of any one of the first to third aspects characterized in that at least one of the gas passage forming bodies of each of the unit cells includes the communication passages in an upstream portion with respect to a gas flow direction in which gas flows in the gas passages. The communication passages are arranged at every predetermined interval in the gas flow direction. The at least one of the gas passage forming bodies lacks the communication passages in a downstream portion with respect to the gas flow direction. The downstream portion of the gas passage forming body, which lacks the communication passages, is greater in length than the predetermined interval.

A fifth aspect of the present invention provides the fuel battery of any one of the first to third aspects characterized in that at least one of the gas passage forming bodies of each of the unit cells includes a flat or lifted downstream portion with respect to a gas flow direction in which gas flows in the gas passages, so that at least some of the communication passages are in communication with each other at locations corresponding to the flat or lifted downstream portion.

A sixth aspect of the present invention provides the fuel battery of any one of the first to fifth aspects characterized in that the gas passages and the water guide passages of each of the gas passage forming bodies extend in straight lines, and the communication passages guide water from the gas passages to the water guide passages using a capillary action.

The first aspect of the present invention improves the gas diffusion performance and enables a uniform current distribution regardless of high or low load conditions. This improves the power generation performance.

In the second aspect of the present invention, even during a low load condition of the fuel battery, when the osmosis water contacts a communication passage, capillary action allows the osmosis water to flow through the communication passage into the water guide passages. This reduces the osmosis water remaining in the gas passages.

In the third aspect of the present invention, the gas passages are groove-shaped. This easily forms the gas passages.

In the fourth and fifth aspects of the present invention, even when remaining water exists in the gas passages, the pressure loss of the water guide passages is significantly high as compared with the pressure loss of the gas passages. This reduces the gas in the gas passages that flows through the communication passages into the water guide passages.

In the sixth aspect of the present invention, each of the gas passage forming bodies is arranged integrally with a corresponding one of the separators. The gas passages and the water guide passages of each of the gas passage forming bodies face the membrane electrode assembly. Therefore, the advantage of the first aspect of the present invention can be easily realized.

In the seventh aspect of the present invention, the gas passages and the water guide passages are arranged in straight lines. This easily forms the gas passages and the water guide passages. Further, during a low load condition of the fuel battery, when the osmosis water contacts a communication passage, capillary action allows the osmosis water to flow through the communication passage into the water guide passages. This reduces the osmosis water remaining in the gas passages.

DETAILED DESCRIPTION OF THE PREFERRED EMBODIMENTS

First Embodiment

A first embodiment of a fuel battery according to the present invention will now be described with reference to FIGS. 1 to 4(b).

Figure 1:
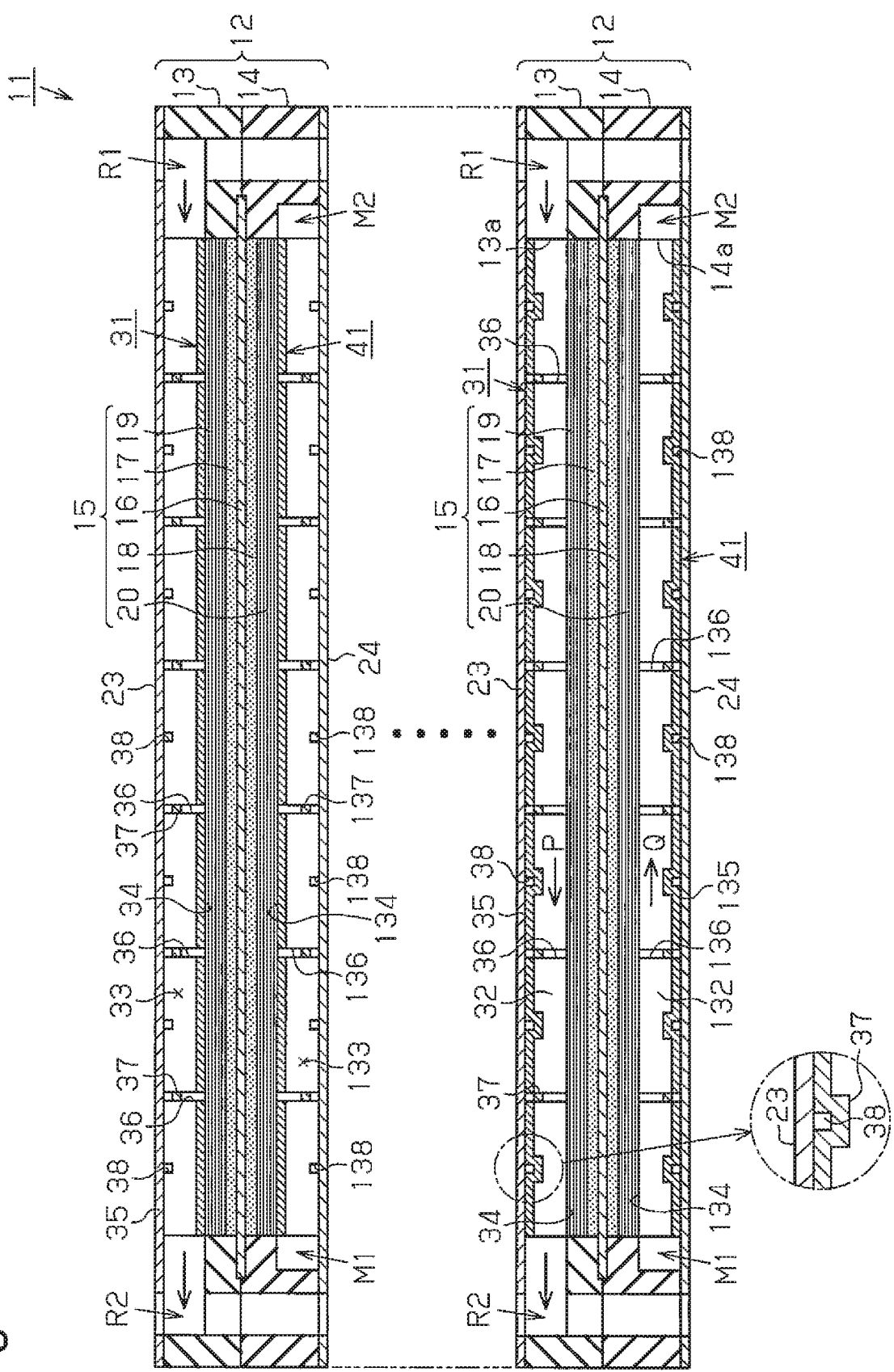
FIG. 1 is a cross-sectional view of a fuel battery according to one embodiment of the present invention.

As shown in FIG. 1, a fuel battery 11 of the first embodiment, which is a solid polymer fuel battery, has a stack structure including a plurality of stacked unit cells 12 and a coolant passage (not shown).

Each unit cell 12 includes a membrane electrode assembly (MEA) 15 in first and second frames 13 and 14, which are tetragonal and formed from a synthetic resin such as synthetic rubber. A fuel gas passage space 13a is defined in the first frame 13. An oxidant gas passage space 14a is defined in the second frame 14.

The membrane electrode assembly 15 is located between the frames 13 and 14. The unit cell 12 includes a first gas passage forming body 31, which is accommodated in the fuel gas passage space 13a and formed from a ferrite stainless steel (SUS), a titanium alloy, or carbon, and a second gas passage forming body 41, which is accommodated in the oxidant gas passage space 14a and formed from a ferrite stainless steel (SUS), a titanium alloy, carbon, a titanium alloy plated with gold, or a gold alloy. Further, the unit cell 12 includes a flat first separator 23 and a flat second separator 24, each of which is formed from a ferrite stainless steel (SUS), a titanium alloy, or carbon. The first separator 23 is bonded to upper surfaces of the first frame 13 and the first gas passage forming body 31 with a seal ring (not shown). The second separator 24 is bonded to lower surfaces of the second frame 14 and the second gas passage forming body 41 with a seal ring (not shown).

The membrane electrode assembly 15 is formed by a solid polymer electrolyte membrane 16, a first electrode catalyst layer 17, a second electrode catalyst layer 18, a first gas diffusion layer 19, and a second gas diffusion layer 20.

The first electrode catalyst layer 17 is formed by depositing a catalyst on a surface of the electrolyte membrane 16 at an anode side, that is, an upper surface in FIG. 1. The second electrode catalyst layer 18 is formed by depositing a catalyst on a surface of the electrolyte membrane 16 at a cathode side, that is, a lower surface in FIG. 1. The solid polymer electrolyte membrane 16 is formed from a solid polymer material having satisfactory proton conductivity under a moist condition. Examples of such a solid polymer material include a fluorinated polymer membrane (e.g., Nafion membrane manufactured by Du Pont). The electrode catalyst layers 17 and 18 each include carbon particles (not shown). A large number of catalyst particles formed from platinum (Pt) are deposited on the carbon particle surfaces. The catalysis of the catalyst particles improves power generation efficiency of the fuel battery. The platinum (Pt) contained in the electrode catalyst layers 17 and 18 functions to enhance separation of hydrogen into a proton and an electron and a reaction to generate water from oxygen, protons, and electrons. Other than platinum, any material may be used as long as it has the same effects.

The conductive first gas diffusion layer 19 is laminated on the electrode catalyst layer 17 at the anode side. The conductive second gas diffusion layer 20 is laminated on the electrode catalyst layer 18 at the cathode side. The gas diffusion layers 19 and 20 are usually made from carbon paper or carbon cloth.

The first gas passage forming body 31 and the second gas passage forming body 41 will now be described. The first gas passage forming body 31 located at the anode side and the second gas passage forming body 41 located at the cathode side have the same structure. Thus, the structure of the first gas passage forming body 31 will only be described. Needless to say, they may have different structures. In FIGS. 1 to 4(b), those components of the second gas passage forming body 41 are each given such a reference numeral that adds one hundred to the reference numeral of the corresponding component of the first gas passage forming body 31. Thus, regarding the second gas passage forming body 41, "first separator 23", "gas diffusion layer 19", and "fuel gas flow direction P" in the description below are to be respectively replaced by "second separator 24", "second gas diffusion layer 20", and "oxidant gas flow direction Q". Additionally, one hundred is to be added to each reference numeral of the corresponding components of the first gas passage forming body 31.

Figure 2A:
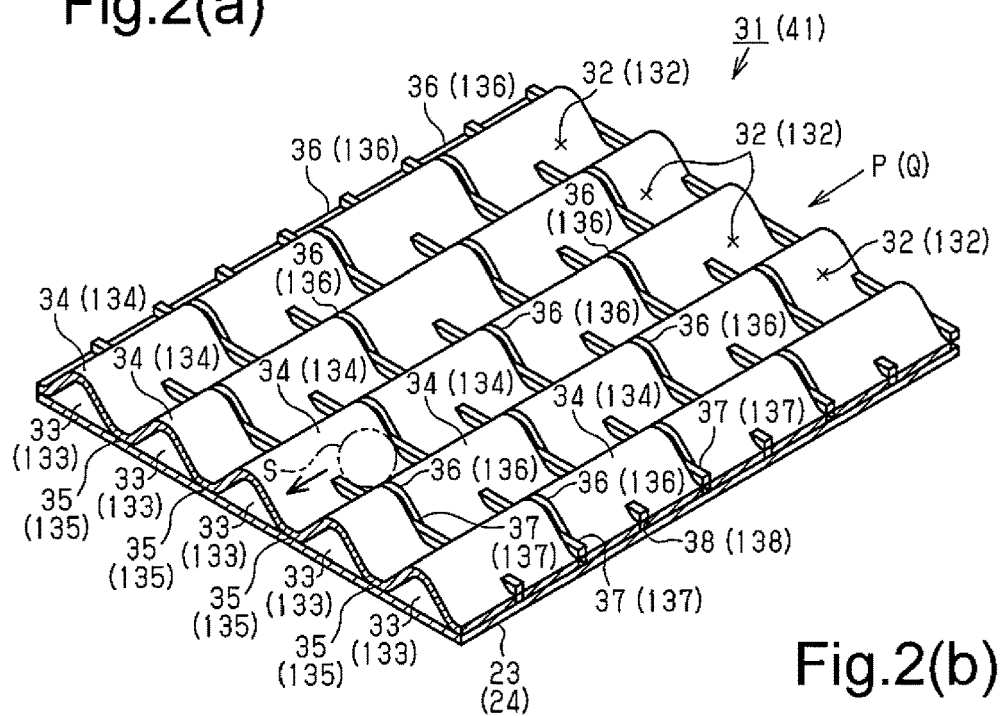
FIG. 2(a) is a partial perspective view of first and second gas passage forming bodies of the fuel battery of FIG. 1.

In FIG. 2(a), a direction in which fuel gas flows is indicated by the arrow P. As shown in FIG. 2(a), groove-shaped gas passages 32 extending in straight lines are located on the surface of the first gas passage forming body 31 that is close to the gas diffusion layer 19 (upper surface in FIG. 2(*a*)). Water guide passages 33 extending in straight lines are located on the surface of the first gas passage forming body 31 that is close to the first separator 23 (lower surface in FIG. 2(*a*)). In the present embodiment, the first gas passage forming body 31 has a generally wave-shaped cross-section when cut in a direction orthogonal to the fuel gas flow direction P. The cross-sectional shape of the first gas passage forming body 31 does not have to be wave-shaped and may be, for example, tetragonal. Each gas passage 32 is located between projections 34, which extend in the fuel gas flow direction P and project toward the gas diffusion layer 19. Each water guide passage 33 is located between projections 35, which extend in the fuel gas flow direction P and project toward the first separator 23. The cross-sectional shape of the first gas passage forming body 31 is not limited to a sine wave and may have another wave form, such as a triangular wave or a pulse wave.

Figure 2B:
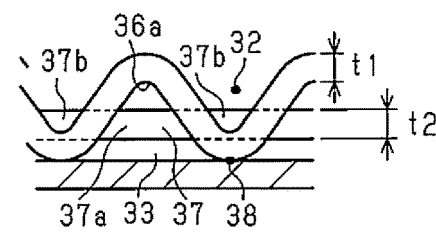
FIG. 2(b) is a diagram illustrating a gas passage and a water guide passage of the fuel battery of FIG. 1.

As shown in FIGS. 2(*a*) and 2(*b*), each of the projections 34 and 35 is pressed to form ribs 37, which extend in the direction orthogonal to the fuel gas flow direction P and located at every predetermined pitch in the first gas passage forming body 31. The ribs 37 located on the adjacent ones of the projections 34 are shifted from each other by half of the pitch, and the ribs 37 located on the adjacent ones of the projections 35 are shifted from each other by half of the pitch.

As shown in FIG. 2(*b*), each rib 37 includes a portion (hereinafter, referred to obstruction plate 37*a*) that is located in one of the water guide passages 33 and bridges the projections 35 and a portion 37*b* that is located in one of the gas passages 32. As shown in the same drawing, the obstruction plate 37*a* of each rib 37 is located between the peaks of the projections 35 and is longer than the portion 37*b*, which is located at a rear side of one of the projections 35. As a result, when a gas passage 32 and a water guide passage 33 are cut along the ribs 37, the water guide passage 33 has a smaller cross-sectional area than that of the gas passage 32. Thus, due to the existence of the obstruction plate 37*a*, the gas passage 32 has a substantially larger cross-sectional open area than that of the water guide passage 33. Consequently, gas mainly flows in the gas passages 32.

As shown in FIGS. 1 and 2(*b*), each rib 37 includes a passage 38 in a longitudinal direction of the rib 37. The passage 38 allows water to move between the adjacent water guide passages 33. In the present embodiment, the first gas passage forming body 31 is formed from a single metal plate. Thus, as shown in FIG. 2(*b*), the thickness t2 of each rib 37 is substantially the same as the thickness t1 of the wave-shaped portion of the first gas passage forming body 31. However, the two thicknesses are not limited to substantially the same amount.

As shown in FIG. 1, the peak of each projection 34 contacts the gas diffusion layer 19, and the peak of each projection 35 contacts the first separator 23. The unit cell 12 located at the uppermost end in FIG. 1 is cut so that the cross-section shows the water guide passages 33 in the drawing, and the unit cell 12 located at the lowermost end in FIG. 1 is cut so that the cross-section shows the gas passages 32 in the drawing.

Referring to FIG. 1, each projection 34 includes communication passages 36 and openings 36*a* at portions corresponding to the obstruction plates 37*a* in the direction orthogonal to the fuel gas flow direction P (i.e., direction in which the gas passages 32 extend). The communication passages 36 and the openings 36*a*, which communicate with the gas passages 32 and the water guide passages 33, are cut by pressing during the formation of the ribs 37 (refer to FIG. 3). The communication passages 36 and the openings 36*a* each have a cross-sectional shape and an open area that produce a capillary action. The pressure loss of the communication passages 36 is set to be greater than that of the gas passages 32.

A process for setting the total pressure loss of the communication passages 36 to be greater than the pressure loss of the gas passages 32 will now be described.

For example, when no communication passages 36 are arranged in a gas passage 32, the pressure loss of the gas passage 32 in a dry state, which is free from the remaining water, is represented by $\Delta Pd$. When no communication passages 36 are arranged and the remaining water stays in a gas passage 32, the pressure loss of the gas passage 32 is represented by $\Delta Pw$. The relationship of the two pressure losses is represented by $\Delta Pw = k \cdot \Delta Pd$. The coefficient k is a value greater than one ($1 < k$) and thus may be two or greater.

The pressure loss of each communication passage 36 that are arranged in a gas passage 32 is represented by $\Delta Pi$, where i=1, 2, . . . , n. When the remaining water exists in the gas passage 32, n is the number of the communication passages 36 that are located toward the upstream of the gas passage from a location where the remaining water exists.

The relationship of the pressure losses between the gas passage 32 and the communication passages 36 is defined as $\Delta Pw = k \Delta Pd < (\Delta P1 + \Delta P2 + \ldots + \Delta Pn)$.

The width and height, which is orthogonal to the width, (i.e., area of the cross-sectional shape) of the gas passage 32 and the communication passages 36 are set so that the above inequality relationship of the pressure losses between the gas passage 32 and the communication passages 36 is satisfied and so that the capillary action occurs in the communication passages 36. Also, the cross-sectional area (i.e., width and the like defining the cross-sectional area) is set to define the pressure loss of the gas passage 32.

As shown in FIG. 1, in each unit cell 12, the frames 13 and 14 and the separators 23 and 24 include an intake passage R1, through which fuel gas (hydrogen gas) is supplied from a fuel gas supply source (e.g., hydrogen tank) (not shown) to the fuel gas passages 32, and a discharge passage R2, through which fuel offgas, which is supplied for power generation, is discharged to the exterior.

In each unit cell 12, the frames 13 and 14 and the separators 23 and 24 include an intake passage M1, through which oxidant gas (air) is delivered from an oxidant gas supply source (e.g., compressor) (not shown) to the oxidant gas passages 132, and a discharge passage M2, through which oxide offgas, which is supplied for power generation, is discharged to the exterior.

Operation of Embodiment

The operation of the fuel battery having the above structure will now be described.

In FIG. 1, fuel (hydrogen) gas, which is supplied from the intake passage R1 to the gas passages 32 of the first gas passage forming body 31, flows in the gas passages 32 in the fuel gas flow direction P (left direction in FIG. 1). By diffusing and passing through the first gas diffusion layer 19, the fuel gas in the gas passages 32 is evenly supplied to the first electrode catalyst layer 17. In FIG. 1, oxidant (oxygen) gas, which is supplied from the compressor through the intake passage M1 to the gas passages 132 of the second gas passage forming body 41, flows in the gas passages 132 in the oxidant gas flow direction Q (right direction in FIG. 1). By diffusing and passing through the second gas diffusion layer 20, the oxidant gas in the gas passages 132 is evenly supplied to the second electrode catalyst layer 18. When the fuel (hydrogen) gas and the oxidant (oxygen) gas are supplied, an electrode reaction occurs in the membrane electrode assembly 15 to generate power. As a result, the fuel battery 11, which includes the stacked unit cells 12 and the coolant passage (not shown), outputs desired power.

Figure 4A:
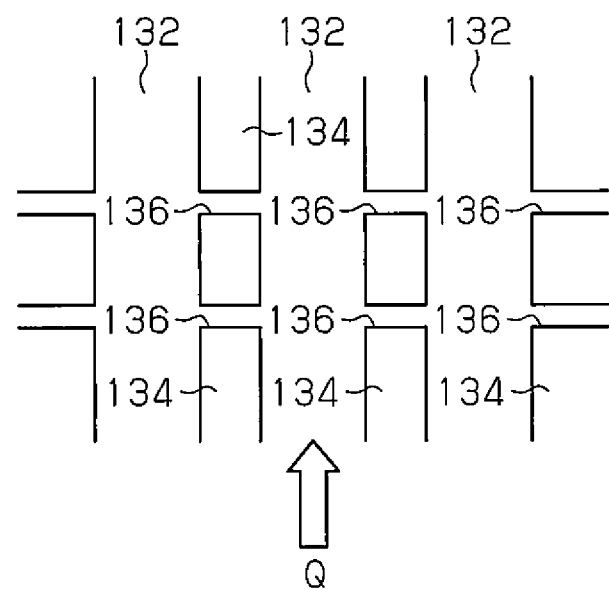
FIGS. 4(a) and 4(b) are each a schematic diagram of gas passages and communication passages of the fuel battery of FIG. 1.
Figure 4B:
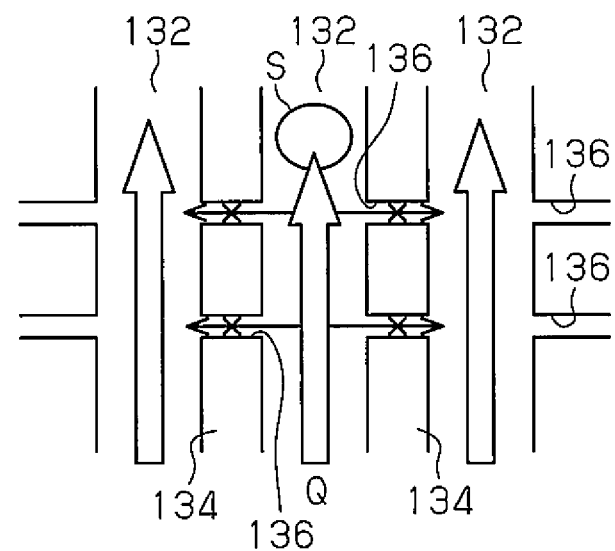

As shown in FIG. 4(*a*), some of the fuel gas, which was not used to generate power, is discharged as fuel offgas from the fuel gas passages 32 of the first gas passage forming body 31 through the discharge passage R2 to the exterior. The oxidant gas, which was not used to generate power, is discharged as oxidant offgas from the gas passages 132 through the discharge passage M2 to the exterior.

The electrode reaction in the membrane electrode assembly 15, which is described above, generates water in the gas passages 132 of the second gas passage forming body 41 at the cathode side. As shown in FIG. 4(*b*), some of the generated water is discharged to the discharge passage R2 by the fluid pressure of the oxidant gas flowing in the gas passages 132. That is, when the fuel battery is in a high load condition, the oxidant gas does not flow into the communication passages 136. The oxidant gas flows in the gas passages 132 as pushing the water. Further, some of the water, which flows through the communication passages 136 to the water guide passages 133, is discharged to the discharge passage R2.

The oxidant gas in the gas passages 132 has a higher pressure than the fuel gas in the fuel gas passages 32. Thus, the pressure difference causes some of the generated water to osmose through the second electrode catalyst layer 18 at the cathode side, the solid polymer electrolyte membrane 16, the first electrode catalyst layer 17, and the first gas diffusion layer 19 to flow into the fuel gas passages 32 of the first gas passage forming body 31 as osmosis water. The osmosis water is discharged to the discharge passage M2 by the fluid pressure of the fuel gas flowing in the gas passages 32.

Also, in this case, when the fuel battery is in a high load condition, the oxidant gas does not flow into the communication passages 36. The oxidant gas flows in the gas passages 32 as pushing the water.

Figure 3:
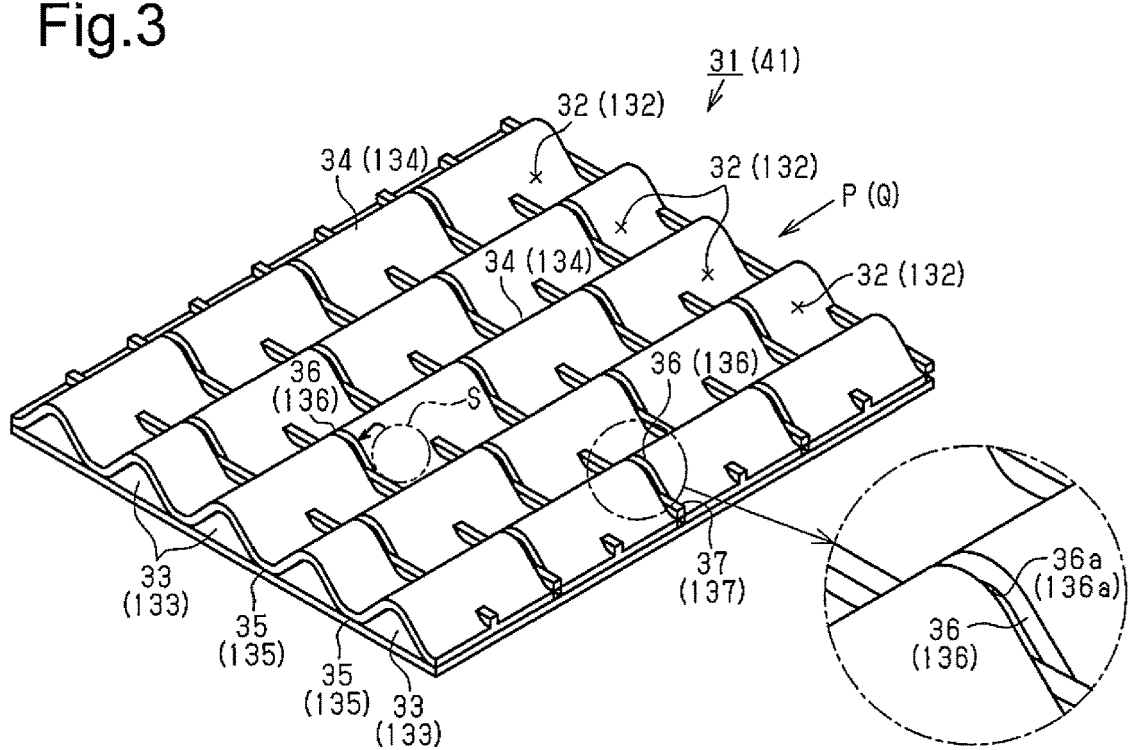
FIG. 3 is a partial perspective view of the first and second gas passage forming bodies of the fuel battery of FIG. 1.

When the fuel battery is in a low load condition, the gas flow (pressure of gas) is low. In this case, as shown in FIG. 3, when the water generated in the gas passages 132 contacts a communication passage 136, the water flows through the communication passage 136 into the water guide passages 133 due to the capillary action. This inhibits the generated water from remaining in the gas passages 132. In the same manner, during a low load condition, if the osmosis water flows and moves in the fuel gas passages 32, when the osmosis water contacts a communication passage 36, the osmosis water flows through the communication passage 36 into the water guide passages 33 due to the capillary action. This inhibits the osmosis water from remaining in the gas passages 32. In the present embodiment, the generated water and the osmosis water are not remained in the gas passages 32 and 132 in this manner. This improves the gas diffusion performance and generates a uniform electrode reaction in the membrane electrode assembly 15, that is, leads to a uniform current distribution. Consequently, the power generation performance is improved.

Accordingly, the fuel battery of the present embodiment has the advantages described below.

(1) The fuel battery of the present embodiment includes the first separator 23 and the second separator 24, which are arranged separately from the first gas passage forming body 31 and the second gas passage forming body 41. The first gas passage forming body 31 includes the water guide passages 33, 133, which are used to discharge water, between the adjacent gas passages 32, 132. Communication passages 36, 136 are arranged between the water guide passage 33, 133 and the adjacent gas passage 32, 132 so that the water in the gas passage 32, 132 is guided to the water guide passage. The communication passages 36, 136 have high pressure losses as compared with that of the gas passage 32, 132. As a result, the present embodiment improves the gas diffusion performance and leads to a uniform current distribution regardless of high or low load conditions. Consequently, the power generation performance is improved.

(2) In the fuel battery of the present embodiment, the first gas passage forming body 31 and the second gas passage forming body 41 are separated from the corresponding separators. The gas passages 32 of the first gas passage forming body 31 and the gas passages 132 of the second gas passage forming body 41 face the solid polymer electrolyte membrane 16. The water guide passages 33 of the first gas passage forming body 31 and the water guide passages 133 of the second gas passage forming body 41 respectively face the first separator 23 located close to the first gas passage forming body 31 and the second separator 24 located close to the second gas passage forming body 41. Therefore, advantage (1) described above is easily realized.

(3) In the present embodiment, each communication passage 36, 136 has a cross-sectional area that produces a capillary action. The capillary action guides the water in a gas passage 32, 132 to the communication passage 36, 136. As a result, even during a low load condition of the fuel battery, when the osmosis water contacts a communication passage 36, the capillary action allows the osmosis water to flow through the communication passage 36 into the water guide passages 33. This inhibits the osmosis water from remaining in the gas passages.

(4) In the fuel battery of the present embodiment, the gas passages 32 and 132 are groove-shaped. Thus, the gas passages are easily formed.

(5) In the fuel battery of the present embodiment, the gas passages 32 and 132 and the water guide passages 33 and 133 are formed in straight lines. Each communication passage 36, 136 has a cross-sectional area that produces a capillary action. The capillary action guides the water in a gas passage 32, 132 to the water guide passages. As a result, in the present embodiment, the gas passages and the water guide passages are easily formed. Also, even during a low load condition of the fuel battery, when the osmosis water contacts a communication passage, the capillary action allows the osmosis water to flow through the communication passage into the water guide passages. This inhibits the osmosis water from remaining in the gas passages.

The present embodiment may be modified as follows.

In the above embodiment, the first gas passage forming body 31 and the second gas passage forming body 41 are arranged separately from the first separator 23 and the second separator 24, respectively. However, at least one of the first gas passage forming body 31 and the second gas passage forming body 41 may be arranged integrally with the corresponding separators.

Figure 5:
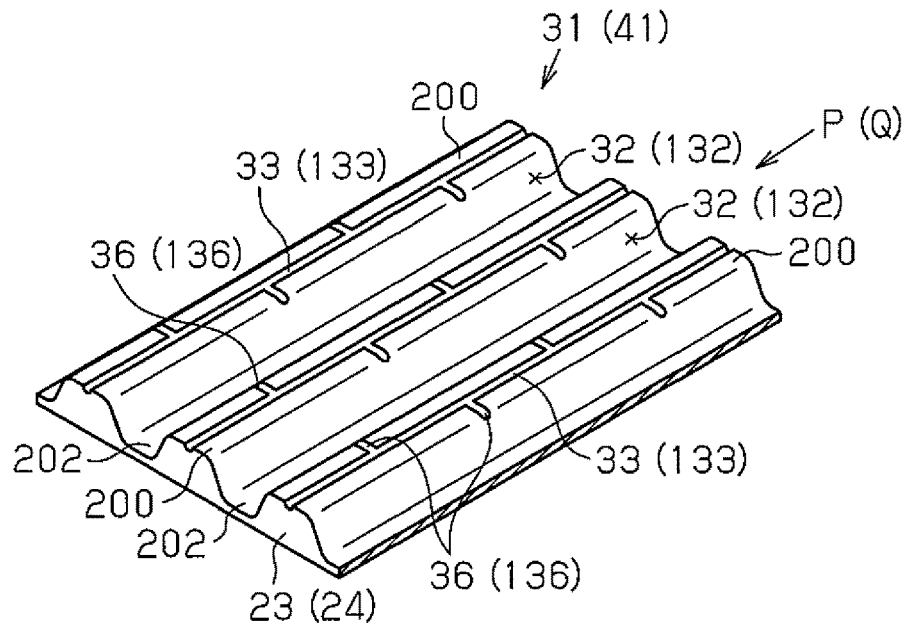
FIG. 5 is a perspective view of a separator according to another embodiment of the present invention.

FIG. 5 shows one example of such a modification. The flat first separator 23 (second separator 24) includes projections 200, which have trapezoidal cross-sections and are parallelly arranged in straight lines. Each groove 202 between the projections 200 is used as a gas passage (gas passage 32, 132). The peak of each projection 200 includes a water guide passage 33 (water guide passage 133) straightly extending in the fuel gas flow direction P (oxidant gas flow direction Q). Communication passages 36 (communication passages 136)

are arranged between the water guide passage 33 (water guide passage 133) and the gas passage 32 (gas passage 132). That is, two adjacent gas passages 32 (gas passage 132) having a projection 200 in between communicate with each other by the corresponding communication passages 36 (communication passages 136) through the water guide passage 33 (water guide passage 133) of the projection 200. Also in the present example, each communication passage 36 (communication passage 136) is formed to produce a capillary action.

Figure 6:
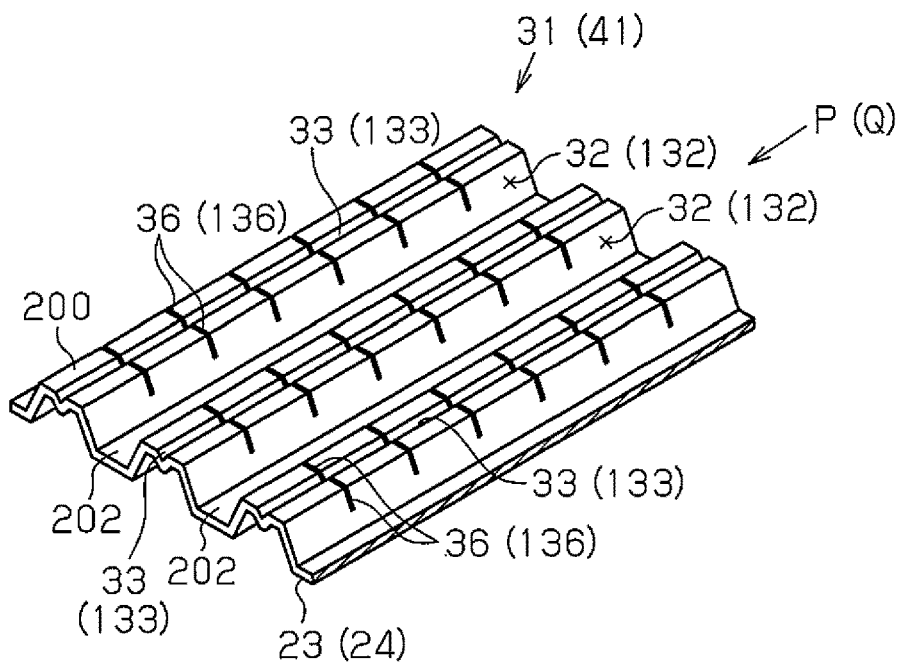
FIG. 6 is a perspective view of a separator according to another embodiment of the present invention.

FIG. 6 shows another example in which the first and second gas passage forming bodies 31 and 41 are arranged integrally with the first and second separators 23 and 24, respectively.

In the example of FIG. 6, a flat-plate material is pressed or the like to form a cross-section having repeated projections and recesses. This forms trapezoidal projections 200 and grooves 202 in straight lines. Each groove 202 is used as a gas passage 32 (gas passage 132). The peak surface of each projection 200 includes a water guide passage 33 (water guide passage 133) extending in the fuel gas flow direction P (oxidant gas flow direction Q). Each water guide passage 33 (water guide passage 133) includes communication passages 36 (communication passages 136), each of which opens to the adjacent gas passage 32 (gas passage 132).

In the fuel battery including the separator of FIG. 5 or 6, the first and second gas passage forming bodies 31 and 41 are arranged integrally with the first and second separators 23 and 24, respectively. The gas passages 32 and 132 and the water guide passages 33 and 133 of the first and second gas passage forming bodies 31 and 41 face the solid polymer electrolyte membrane. Therefore, advantage (1) of the first embodiment is obtained.

The location of the water guide passages 33 (water guide passages 133) is not limited to those shown in FIGS. 5 and 6 and thus may be freely arranged.

In the above embodiment, the groove-shaped gas passages 32 are arranged in straight lines. Also, the water guide passages 33 are arranged on the surface of the first separator 23 in straight lines. However, there is no need to limit to straight lines. Another shape such as a curve may be used.

Figure 7:
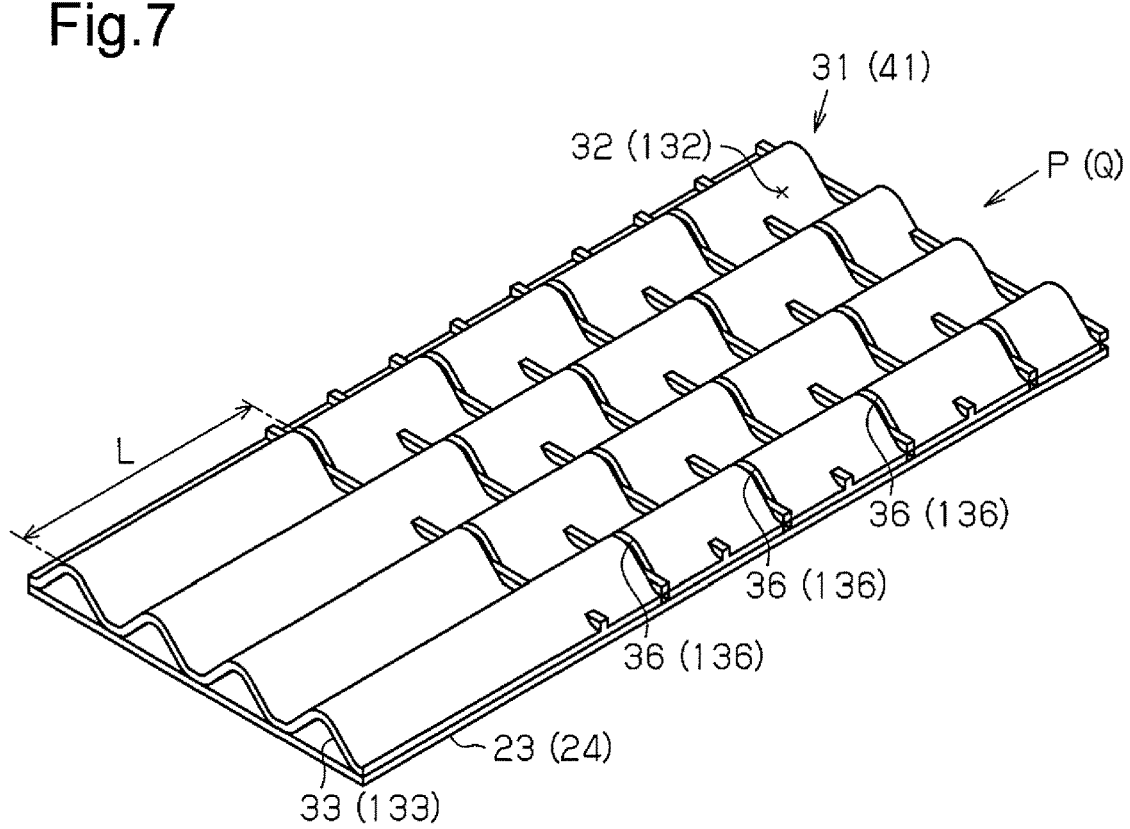
FIG. 7 is a perspective view of a gas passage forming body according to another embodiment of the present invention.

Each gas passage forming body 31 (41) of the fuel battery 11 of the above embodiment may be replaced by such a gas passage forming body 31 (41) as shown in FIG. 7. In the gas passage forming body 31 (41) of FIG. 7, communication passages 36 (136) are arranged in an upstream portion with respect to the fuel gas flow direction P (or, oxidant gas flow direction Q) and located at every predetermined interval along the fuel gas flow direction P (or, oxidant gas flow direction Q). In contrast, no communication passages 36 (136) are arranged in a downstream portion with respect to the fuel gas flow direction P (or, oxidant gas flow direction Q). Preferably, the downstream portion with respect to the fuel gas flow direction P (or, oxidant gas flow direction Q), which is free from the communication passages 36 (136), has the length L that is greater than the above predetermined interval. In this case, the fuel gas (or, oxidant gas) in the gas passages 32 (132) is inhibited from flowing through the communication passages 36 (136) into the water guide passages 33 (133). This is because the downstream portion with respect to the fuel gas flow direction P (or, oxidant gas flow direction Q) is free from the communication passages 36 (136). Thus, even when the remaining water exists in a gas passage 32 (132), the water guide passages 33 (133) have sufficiently large pressure losses as compared with the pressure loss of the gas passage 32. The gas in the water guide passages 33 (133) is discharged without being used to generate power. Thus, inhibition of the fuel gas (or, oxidant gas) from flowing into the water guide passages 33 (133) improves the gas usage efficiency.

Figure 8:
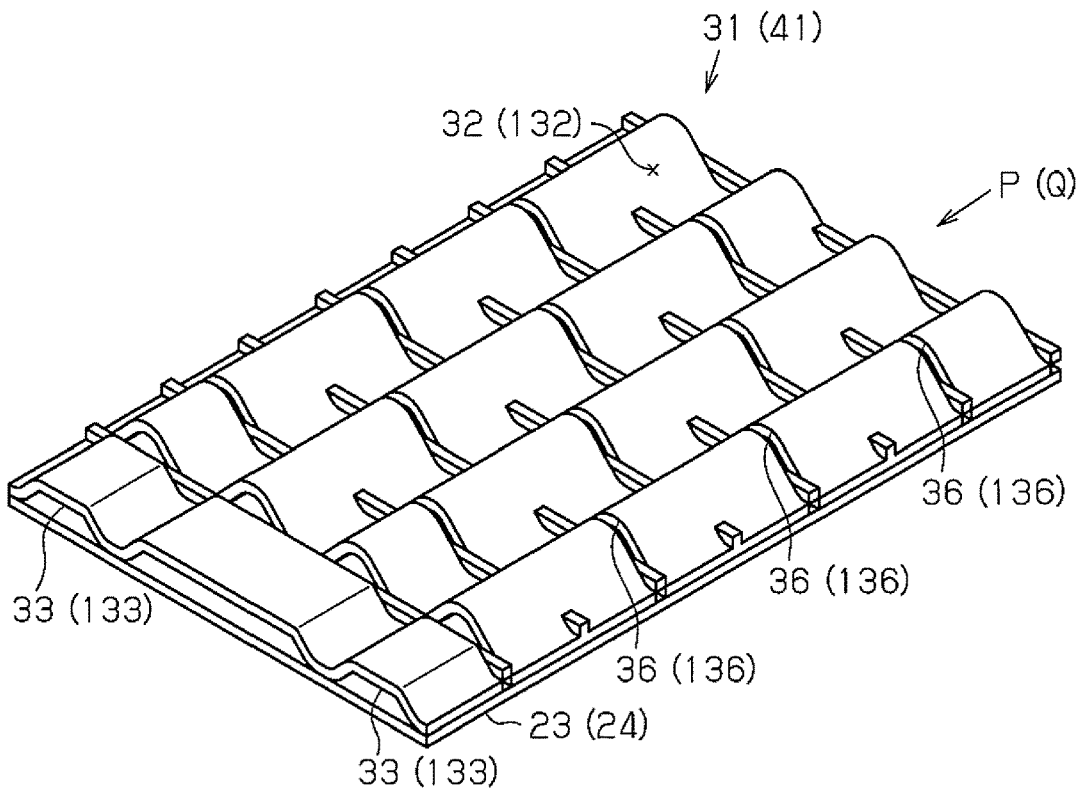
FIG. 8 is a perspective view of a gas passage forming body according to another embodiment of the present invention.
Figure 9:
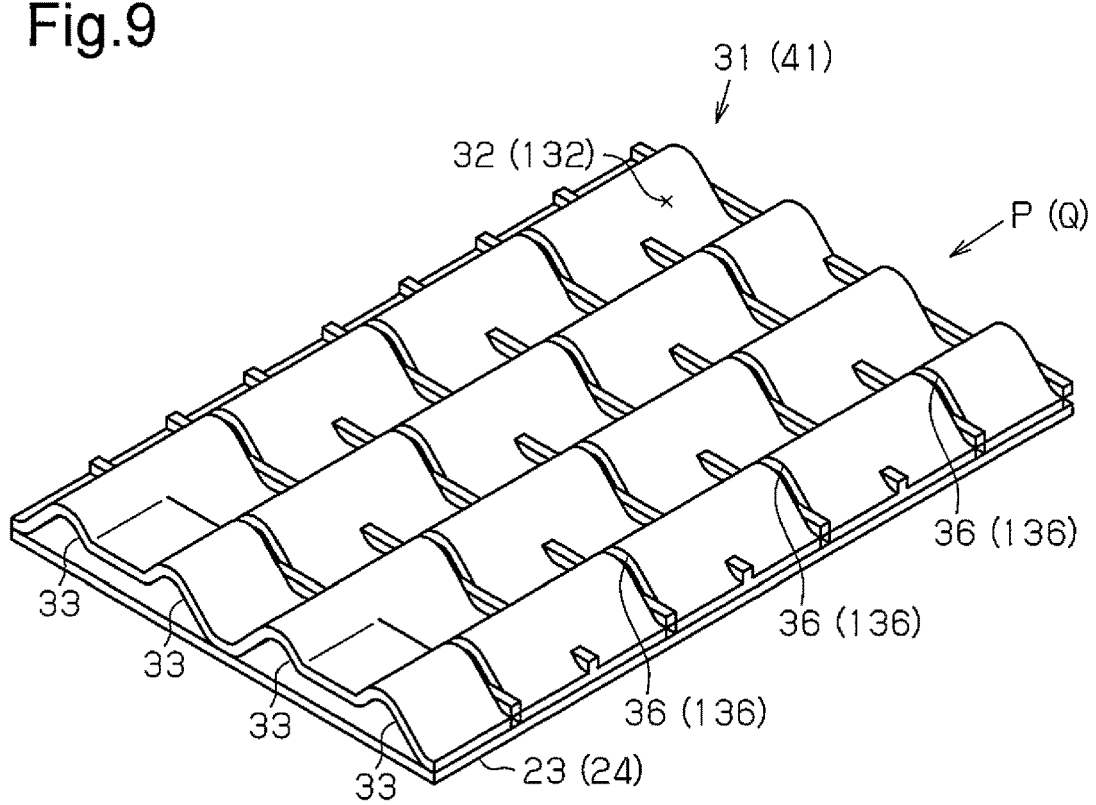
FIG. 9 is a perspective view of a gas passage forming body according to another embodiment of the present invention.
Figure 10:
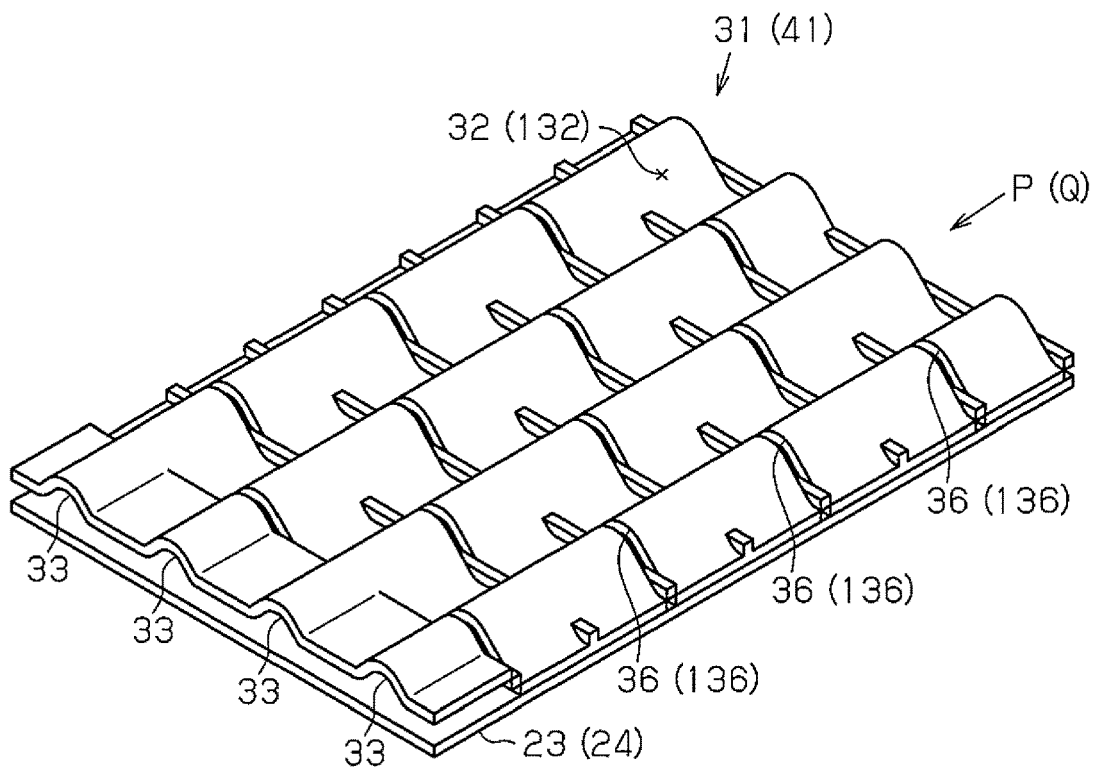
FIG. 10 is a perspective view of a gas passage forming body according to another embodiment of the present invention.
Figure 11:
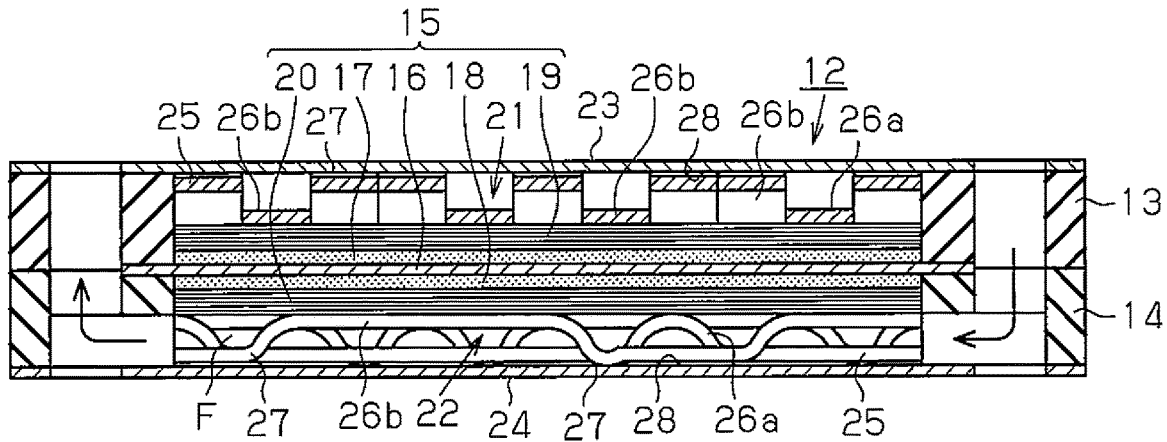
FIG. 11 is a schematic cross-sectional view of one example of a fuel battery cell in the prior art.
Figure 12:
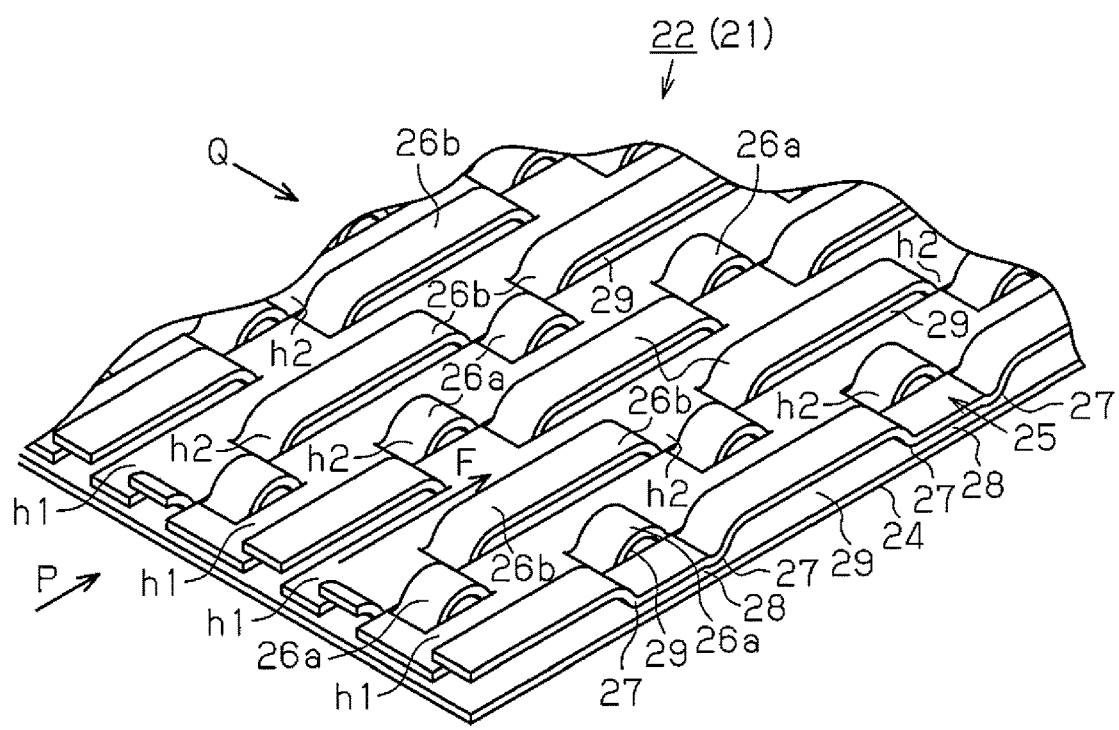
FIG. 12 is a partial perspective view of a second gas passage forming body of the fuel battery cell of FIG. 11.
Figure 13:
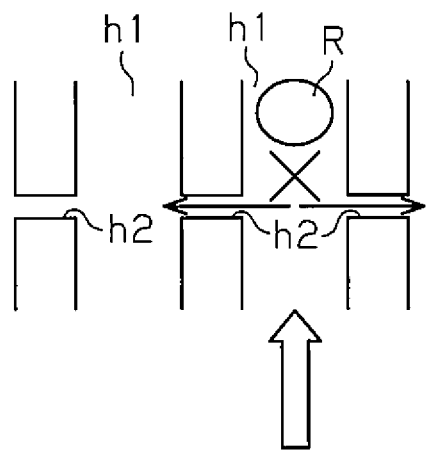
FIG. 13 is a schematic view of main passages and sub-passages when remaining water exists in the fuel battery cell of FIG. 11.
Figure 14:
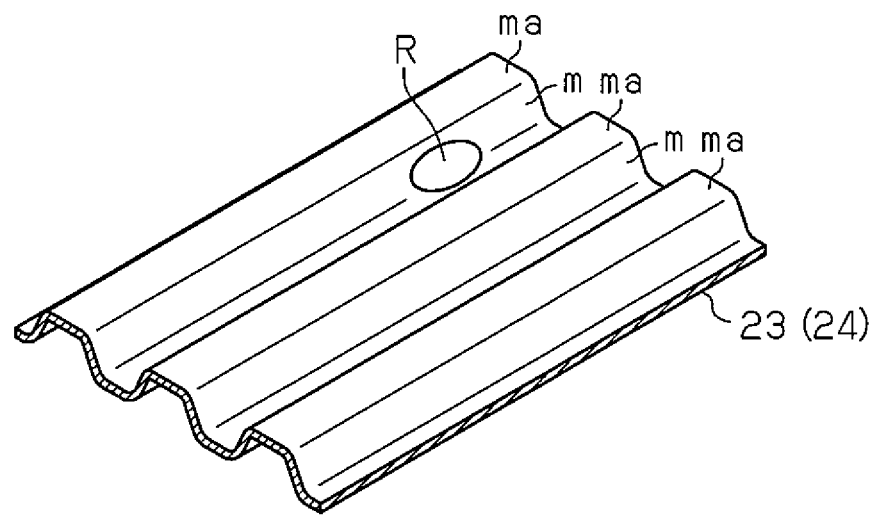
FIG. 14 is a perspective view of another example of the prior art when remaining water exists in a groove passage of a separator.

Each gas passage forming body 31 (41) of the fuel battery 11 of the above embodiment may be replaced by one of such gas passage forming bodies 31 (41) as shown in FIGS. 8 to 10. In the gas passage forming body 31 (41) of FIG. 8, the downstream portion with respect to the fuel gas flow direction P (or, oxidant gas flow direction Q) is flat. Thus, the adjacent water guide passages 33 (133) communicate with each other at locations corresponding to the downstream portion. In the gas passage forming body 31 (41) of FIG. 9, the downstream portion with respect to the fuel gas flow direction P (or, oxidant gas flow direction Q) is partially lifted. Thus, the adjacent water guide passages 33 (133) partially communicate with each other at locations corresponding to the downstream portion. In the gas passage forming body 31 (41) of FIG. 10, the downstream portion with respect to the fuel gas flow direction P (or, oxidant gas flow direction Q) is entirely lifted. Thus, the adjacent water guide passages 33 (133) entirely communicate with each other at locations corresponding to the downstream portion. In these cases, even when the remaining water exists in a gas passage 32 (132), the water guide passages 33 (133) have sufficiently large pressure losses as compared with the pressure loss of the gas passage 32. This inhibits the fuel gas (or, oxidant gas) in the gas passage 32 (132) from flowing through the communication passages 36 (136) into the water guide passages 33 (133).

The invention claimed is:

1. A fuel battery comprising:
a plurality of stacked unit cells, at least one of the unit cells comprising:
a membrane electrode assembly;
a pair of separators, the membrane electrode assembly positioned between the separators; and
a pair of solid gas passage forming bodies, each of the solid gas passage forming bodies having a length and positioned between the membrane electrode assembly and one of the separators, each of the solid gas passage forming bodies having a wave-shaped cross-section to include a plurality of first projections, each of which extends straightly and continuously throughout the length of the solid gas passage forming body and projects toward and contacts the membrane electrode assembly, and a plurality of second projections, each of which extends straightly and continuously throughout the length of the solid gas passage forming body and projects toward and contacts one of the separators, thereby defining a plurality of gas passages between the membrane electrode assembly and the solid gas passage forming body, each of which extends straightly and continuously throughout the length of the solid gas passage forming body, and a plurality of water guide passages between one of the separators and the solid gas passage forming body, each of which extends straightly and continuously throughout the length of the solid gas passage forming body and is disposed between adjacent ones of the gas passages, each of the gas passages having a cross-sectional shape that widens toward the membrane electrode assembly, each of the solid gas passage forming bodies having communication passages that guide water from the gas passages to the water guide passages, the communication passages each presenting a communication passage width, and a communication passage length transverse to the length of the solid gas passage forming body, the communication passages having a higher pressure loss than that of the gas passages, whereby gas in the gas passages is inhibited from flowing into the water guide passages, wherein the communication passages are spaced apart from each other by a first distance, wherein the first distance is greater than the communication passage width and the communication passage length, and each of the solid gas passage forming bodies having a plurality of ribs, wherein each of the plurality of ribs extends through the communication passages, straightly and continuously throughout the width of the solid gas passage forming body, each of the plurality of ribs having a rib width that corresponds to the communication passage width.

2. The fuel battery according to claim 1, wherein the communication passages guide water from the gas passages to the water guide passages using a capillary action.

3. The fuel battery according to claim 1, wherein each of the solid gas passage forming bodies of the at least one of the unit cells includes the communication passages in an upstream portion with respect to a gas flow direction in which gas flows in the gas passages, the communication passages are arranged at a constant distance from one communication passage to the next communication passage in the gas flow direction, the solid gas passage forming bodies lack the communication passages in a downstream portion with respect to the gas flow direction, and the downstream portion of each of the solid gas passage forming bodies, which lacks the communication passages, is greater in length than the constant distance.

4. The fuel battery according to claim 1, wherein the each of the solid gas passage forming bodies of the at least one of the unit cells includes a flat or lifted downstream portion with respect to a gas flow direction in which gas flows in the gas passages, so that at least some of the communication passages are in communication with each other at locations corresponding to the flat or lifted downstream portion.

* * * * *